United States Patent [19]
Chebre et al.

[11] Patent Number: 5,831,850
[45] Date of Patent: Nov. 3, 1998

[54] METHOD AND DEVICE FOR CONTROL OVER AN ADMISSABLE RANGE WITH CONTEXTUAL ANTICIPATION USING FUZZY LOGIC

[75] Inventors: Mériam Chebre, Sainte Foy les Lyon; Jean-Pierre Beauchene, La Chapelle Launay, both of France

[73] Assignee: Elf Exploration Production, Courbevoie, France

[21] Appl. No.: 500,254

[22] Filed: Jul. 10, 1995

[30] Foreign Application Priority Data

Jul. 11, 1994 [FR] France .................................. 94 08524

[51] Int. Cl.$^6$ .............................. G05B 19/04; G06F 9/44
[52] U.S. Cl. .......................... 364/158; 364/149; 364/166; 364/500; 364/501; 364/221.9; 364/274.6; 395/3; 395/10; 395/11; 395/52; 395/61; 395/900; 395/903; 395/906
[58] Field of Search .......................... 364/148, 152–153, 364/158, 161–163, 500, 501, 274.6, 149, 579, 164–166, 221, 221.2, 221.9, 275.2, 274.3–274.5; 395/3, 10, 51–52, 61, 76, 900, 903, 906, 11, 500, 920

[56] References Cited

U.S. PATENT DOCUMENTS

| | | | |
|---|---|---|---|
| 4,872,763 | 10/1989 | Higuchi et al. | 366/152.1 |
| 4,976,377 | 12/1990 | Higuchi et al. | 222/55 |
| 5,186,150 | 2/1993 | Sekine | 123/494 |
| 5,241,651 | 8/1993 | Ueda | 395/61 |
| 5,245,528 | 9/1993 | Saito et al. | 364/161 |
| 5,245,698 | 9/1993 | Matsunaga | 395/61 |
| 5,251,124 | 10/1993 | Matsunaga | 364/176 |
| 5,331,565 | 7/1994 | Hattori et al. | 364/472 |
| 5,367,610 | 11/1994 | Ohtsubo et al. | 395/3 |
| 5,410,470 | 4/1995 | Yamaoka et al. | 364/165 |
| 5,412,757 | 5/1995 | Endo | 395/61 |
| 5,479,580 | 12/1995 | Kinoshita | 395/51 |
| 5,517,424 | 5/1996 | Marcelle et al. | 364/494 |
| 5,519,740 | 5/1996 | Chao | 376/216 |

OTHER PUBLICATIONS

Article entitled "Fuzzy Averaging Level Control in Distillation Drums with Intelligent Mangement of Delayed Disturbances" presented at the European Refining Technology Conference held in London, on Jun. 25–27th, 1997.

Article presented at the Conference on the applications of Artificial Intelligence in the Petroleum Industry (AI PETRO) held in Sep. 1993 in Lillehammer, Norway, published by Editions Technip.

*Primary Examiner*—James P. Trammell
*Assistant Examiner*—Tuan Q. Dam
*Attorney, Agent, or Firm*—Burgess, Ryan & Wayne

[57] ABSTRACT

For controlling physical quantities in industrial plants, and particularly in the crude oil processing industries, the chemical and papermaking industries and gas, power stations and distribution networks, the value of a controlled physical quantity, subjected to perturbations, is kept between two limit values by modifying an action quantity. The action quantity should have small amplitudes in order to stabilize the downstream flows and should evolve so as to anticipate the perturbations. It is determined by performing fuzzy inference on a set of predefined decision rules, on the basis of values of the controlled physical quantity, of a secondary variable connected with the controlled physical quantity and of a context variable obtained from at least one detection variable or from a combination of detection variables representative of the physical quantities at the origin of the perturbations in the controlled physical quantity.

16 Claims, 6 Drawing Sheets

FIG_1

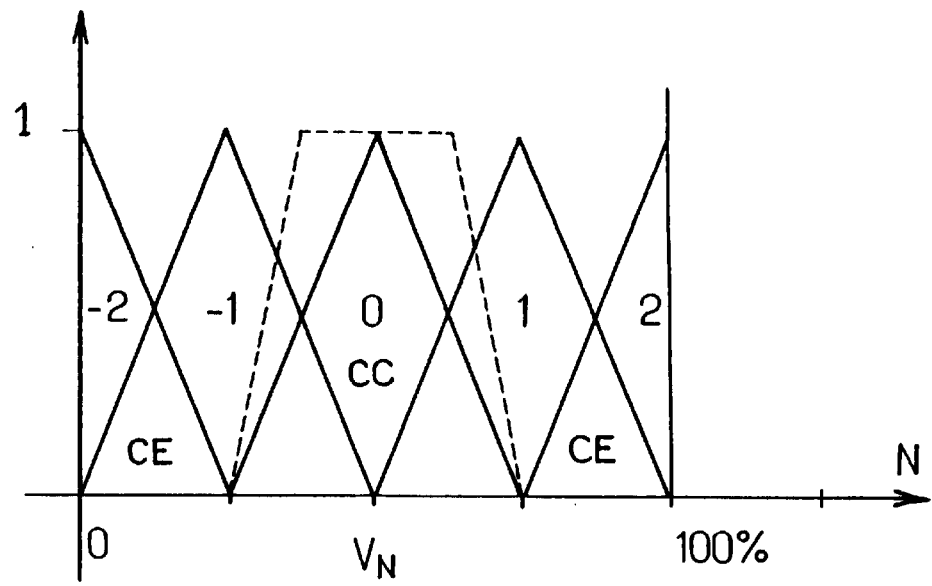
FIG_3
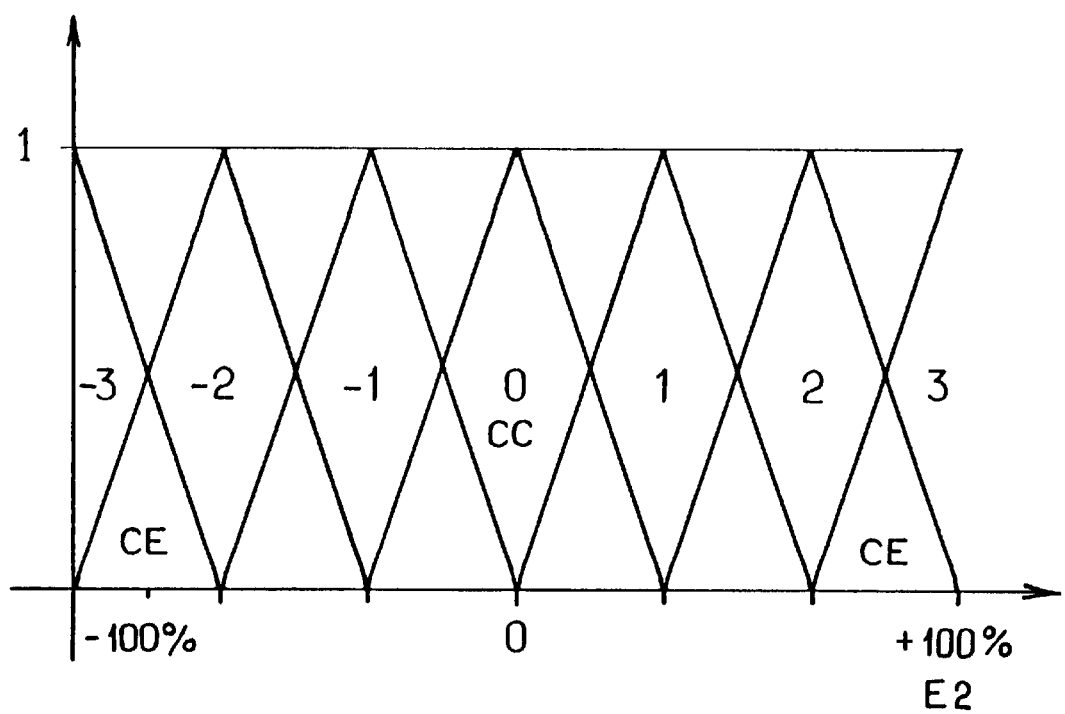
FIG_4

T0

| N\E2 | -3 | -2 | -1 | 0 | 1 | 2 | 3 |
|---|---|---|---|---|---|---|---|
| -2 | -3 | -3 | -3 | -3 | -3 | -3 | -3 |
| -1 | -3 | -3 | -3 | -1 | 1 | 2 | 3 |
| 0 | -3 | -2 | -2 | 0 | 2 | 2 | 3 |
| 1 | -3 | -2 | -1 | 1 | 3 | 3 | 3 |
| 2 | 3 | 3 | 3 | 3 | 3 | 3 | 3 |

T1

| N\E2 | -3 | -2 | -1 | 0 | 1 | 2 | 3 |
|---|---|---|---|---|---|---|---|
| -2 | -3 | -3 | -3 | -3 | -3 | -3 | -3 |
| -1 | -3 | -3 | -3 | 0 | 1 | 2 | 3 |
| 0 | -3 | -2 | -1 | 0 | 2 | 2 | 3 |
| 1 | 3 | 3 | 3 | 1 | 3 | 3 | 3 |
| 2 | 3 | 3 | 3 | 3 | 3 | 3 | 3 |

T4

| N\E2 | -3 | -2 | -1 | 0 | 1 | 2 | 3 |
|---|---|---|---|---|---|---|---|
| -2 | -3 | -3 | -3 | -3 | -3 | -3 | -3 |
| -1 | -3 | -3 | -3 | -1 | -3 | -3 | -3 |
| -0 | -3 | -2 | -2 | 0 | 1 | 2 | 3 |
| 1 | -3 | -2 | -1 | 0 | 3 | 3 | 3 |
| 2 | 3 | 3 | 3 | 3 | 3 | 3 | 3 |

T2

| N\E2 | -3 | -2 | -1 | 0 | 1 | 2 | 3 |
|---|---|---|---|---|---|---|---|
| -2 | -3 | -3 | -3 | 0 | -3 | -3 | -3 |
| -1 | -3 | -3 | -3 | 0 | 1 | 2 | 3 |
| 0 | -2 | -1 | 0 | 0 | 2 | 2 | 3 |
| 1 | 3 | 3 | 3 | 1 | 3 | 3 | 3 |
| 2 | 3 | 3 | 3 | 3 | 3 | 3 | 3 |

T5

| N\E2 | -3 | -2 | -1 | 0 | 1 | 2 | 3 |
|---|---|---|---|---|---|---|---|
| -2 | -3 | -3 | -3 | -3 | -3 | -3 | -3 |
| -1 | -3 | -3 | -3 | -1 | -3 | -3 | -3 |
| 0 | -3 | -2 | -2 | 0 | 0 | 1 | 2 |
| 1 | -3 | -2 | -1 | 0 | 3 | 3 | 3 |
| 2 | 3 | 3 | 3 | 3 | 3 | 3 | 3 |

T3

| N\E2 | -3 | -2 | -1 | 0 | 1 | 2 | 3 |
|---|---|---|---|---|---|---|---|
| -2 | -3 | -3 | -3 | -3 | -3 | -3 | -3 |
| -1 | -3 | -3 | -3 | 0 | 1 | 2 | 3 |
| 0 | -1 | 0 | 0 | 0 | 2 | 2 | 3 |
| 1 | 3 | 3 | 3 | 1 | 3 | 3 | 3 |
| 2 | 3 | 3 | 3 | 3 | 3 | 3 | 3 |

T6

| N\E2 | -3 | -2 | -1 | 0 | 1 | 2 | 3 |
|---|---|---|---|---|---|---|---|
| -2 | -3 | -3 | -3 | -3 | -3 | -3 | -3 |
| -1 | -3 | -3 | -3 | -1 | -3 | -3 | -3 |
| 0 | -3 | -2 | -2 | 0 | 0 | 0 | 1 |
| 1 | -3 | -2 | -1 | 0 | 3 | 3 | 3 |
| 2 | 3 | 3 | 3 | 3 | 3 | 3 | 3 |

FIG_5

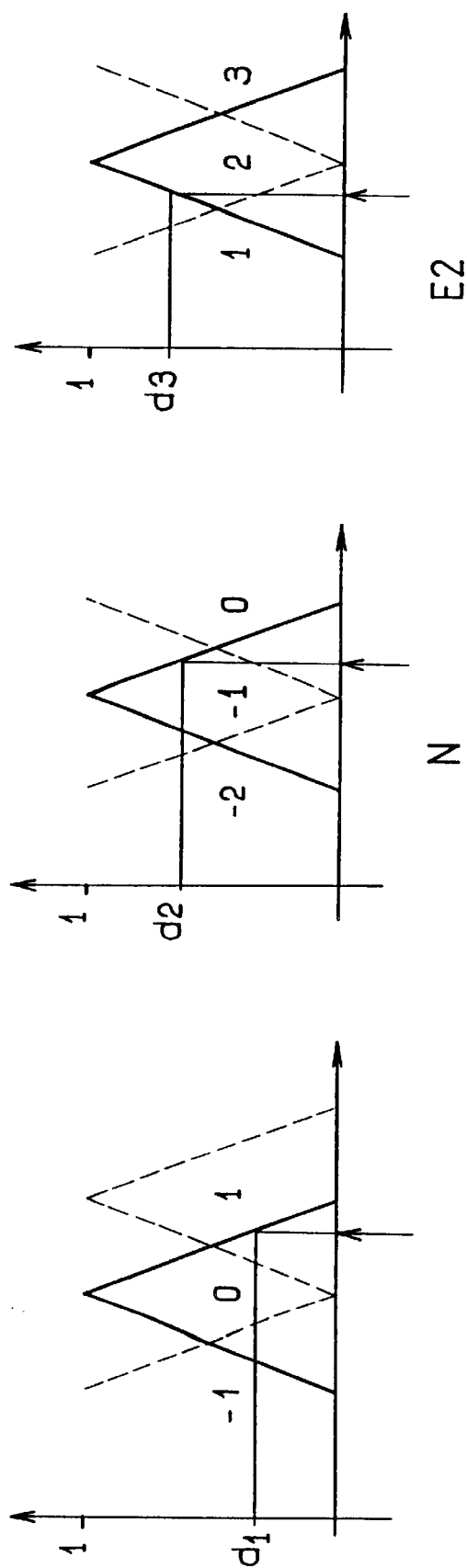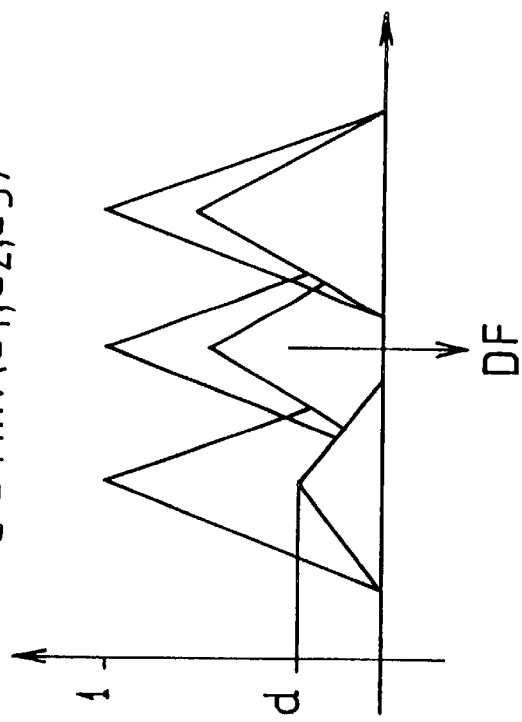
FIG._7

METHOD AND DEVICE FOR CONTROL OVER AN ADMISSABLE RANGE WITH CONTEXTUAL ANTICIPATION USING FUZZY LOGIC

BACKGROUND OF THE INVENTION

Technical Field

The present invention relates to a control method consisting in keeping the value of a controlled physical quantity, subjected to perturbations, between two limit values by modifying an action quantity. According to this method, the value of the action quantity is calculated by using the instantaneous values of the controlled physical quantity, a constructed secondary variable connected with the direction of variation of the controlled physical quantity and a context variable calculated from a combination of detection variables which are representative of the causes of perturbation in the controlled physical quantity.

The present invention also relates to a device for implementing this method.

It finds its application in all industries, laboratories and workshops which exploit manufacturing units which involve systems for controlling physical quantities to be kept between two limit values, while they are subjected to perturbations and it is desired to disturb the action quantity as little as possible in order to stabilize the flows of products conveyed between two manufacturing sections. The oil, chemical, petrochemical and paper industries, power production stations, cement works and glassworks are particularly relevant.

By way of example, mention may be made by way of controlled physical quantities of the liquid levels in tanks, balloons, column bottoms and gas pressures at the head of distillation columns and in distribution networks.

PRIOR ART

Known methods and devices for controlling physical quantities have the purpose of keeping the value of a controlled physical quantity at a value close to a fixed set-point value by modifying the value of an action quantity. If the process in which the control device acts is perturbed, it is observed that the action variable is subjected to large fluctuations, which has the consequence of perturbing the operation of the systems located downstream to the extent that they are difficult to use.

It is also known that, in order to control a perturbed physical quantity, it is possible to take into account the values of the measureable perturbations in order to limit the amplitude of the fluctuations of the controlled physical quantity, but this also leads to very large amplitudes of the action variable, with the same drawbacks.

In order to improve the operation of conventional control systems, and in particular to facilitate their implementation by resorting to empirical expert knowledge which can replace complex modelling, methods employing fuzzy inference mechanisms have been proposed. One of these methods is described in the article SIMPLIFY FUZZY CONTROL IMPLEMENTATION by K. E. STOLL, P. A. S. RALSTON and S. RAMAGANESAN published in the journal HYDROCARBON PROCESSING of July 1993.

The control method described in this document consists in keeping a controlled physical quantity equal to a fixed set-point value, by acting on an action quantity. With numerous methods, it is observed that the variation amplitudes of the action quantity are very large because it is desired to obtain as small as possible a difference between the controlled physical quantity and the set-point.

Furthermore, this control method is very sensitive to the perturbations which result from the variations in the physical quantities involved upstream in the manufacturing system, which is manifested by large amplitude variations of the action quantity.

These large amplitude variations in turn perturb the operation of the downstream sectors of manufacturing units to the extent that they are rendered inoperable, which leads in the end to production losses and significant work overload for the process operators.

SUMMARY OF THE INVENTION

The object of the invention is precisely to overcome these drawbacks and, in particular, to provide a method and a device for keeping a controlled physical quantity, subjected to perturbations, between two limit values by modifying the command value of an actuator which acts on an action quantity. By virtue of this method and this device, the variations in the action quantity, due to the perturbations, are reduced to values which are acceptable for the systems downstream of the actuator.

To this end, the present invention provides a method for controlling the value of a physical quantity which is characteristic of the operation of a manufacturing unit and dependent on an action quantity represented by the opening value of a valve for controlling a fluid flow circulating in this unit, the physical quantity being subjected to perturbations, which method is of the type comprising the steps of modifying the value of the action quantity determined by using the instantaneous value of the controlled physical quantity, in order to keep the value of the controlled physical quantity between two limit values located on either side of a nominal value, and is characterized in that, for the control, use is also made of the values of a secondary constructed variable, connected with the direction of variation of the controlled physical quantity and the values of a context variable obtained from at least one detection variable or from a combination of detection variables, which are representative of the physical quantities at the origin of the perturbations in the controlled physical quantity, and in that the control is implemented by defining an operation range and a series of characteristic operation classes with central classes and extreme classes for the controlled physical quantity, for the secondary variable, for the context variable, for the action quantity, then defining a set of decision rules, each rule consisting in associating one value class of the controlled physical quantity, one class of the secondary variable, and one class of the context variable with one class of the action variable, and performing fuzzy inference on the set of decision rules on the basis of the values of the controlled physical quantity, of the secondary variable and of the context variable, in order to obtain the value of the action quantity.

According to another characteristic, the present invention provides a method characterized in that the secondary variable is obtained by differentiating the controlled physical quantity with respect to time.

According to another characteristic, the present invention provides a method characterized in that the secondary variable is obtained by applying the following formula:

$$E_2 = \frac{(DN)^3}{|DN|}$$

in which
$E_2$ represents the secondary variable;
DN represents the derivative of the controlled physical quantity with respect to time;
|DN| is the absolute value of DN.

According to another characteristic, the present invention provides a method characterized in that determination of the context variable comprises the steps consisting in determining the value of each of the detection variables, subjecting each of these values to an adapted time-filtering function, then linearly combining the values thus obtained, and assigning to them an adapted weighting coefficient.

According to another characteristic, the present invention provides a method characterized in that determination of the context variable comprises the steps of determining the value of each of the detection variables, subjecting each of these values to an adapted time-filtering function, then describing each of the filtered detection variables in the form of a fuzzy variable, combining the fuzzy variables obtained in a set of decision rules and in carrying out fuzzy inference on this set of rules in order to obtain the context variable.

According to another characteristic, the present invention provides a method characterized in that the controlled physical quantity, the secondary variable, the context variable and the detection variables are described in the form of fuzzy variables with triangular class membership function profiles, the classes being uniformly distributed over each operation range.

According to another characteristic, the present invention provides a method characterized in that the central class (classes) which corresponds (correspond) to the nominal operation ranges of the controlled physical quantity are described with the aid of trapezoidal class membership function profiles.

According to another characteristic, the present invention provides a method characterized in that the intrinsic limits of the extreme classes of the value of the controlled physical quantity can be modified so as to adapt the behaviour of the control in perturbed phase, in the vicinity of the limits of the controlled physical quantity.

According to another characteristic, the present invention provides a method characterized in that the decision rules which employ the central classes for the secondary variable and the context variable are modified in order to ensure controlled recentering around the nominal value of the controlled physical quantity in unperturbed regime.

According to another characteristic, the present invention provides a method characterized in that the decision rules which employ the extreme classes of the controlled physical quantity are modified so as to ensure unconditional recentering of the controlled physical quantity within its operation range.

A further subject of the invention is a control device for keeping a controlled physical quantity subjected to perturbations within two limit values, by acting on an action quantity on which the controlled physical quantity depends, the device comprising:

a sensor for measuring the controlled physical quantity, providing on one output a measurement signal representative of the instantaneous value of the quantity;
measurement sensors making it possible to construct detection variables representative of causes of perturbation in the value of the controlled physical quantity, the sensors providing on outputs measurement signals of the variables;
a controllable actuator, including a command input and an output connected to a component for controlling the action quantity;
a measurement circuit, connected to the output of the sensor for measuring the controlled physical quantity and to the outputs of the sensors for the detection variables, which delivers on one output signals representative respectively of the controlled physical quantity and of the detection variables;
a processing unit connected to the output of the measurement circuit, providing on one output a signal representative of the calculated value of the action quantity;
dialogue means connected to the processing unit;
a command circuit including an input connected to the output of the processing unit and an output connected to the command input of the controllable actuator;
and being characterized in that the processing unit includes, on the one hand, storage means which contain at least one decision rule table and a program for calculating the action quantity from the value of the controlled physical quantity, from the value of a constructed secondary quantity connected with the direction of variation of the said controlled physical quantity and from the value of a context variable calculated from a combination of detection variables which are representative of the physical quantities causing the perturbations in the controlled physical quantity, the program employing fuzzy inference mechanisms and, on the other hand, a program for executing the calculation program.

According to another characteristic, the present invention provides a device characterized in that the storage means contain a processing program which comprising the steps of calculating the context variable by subjecting the value of each of the detection variables to an adapted time-filtering function, then by linearly combining the values thus obtained while assigning a weighting coefficient to them.

According to another characteristic, the present invention provides a device characterized in that the storage means contain a processing program which comprising the steps of calculating the context variable by subjecting the value of each of the detection variables to an adapted time-filtering function, then using the values thus obtained in a set of decision rules according to fuzzy inference mechanisms.

According to a first embodiment, the subject of the invention is a device characterized in that the measurement circuit, the command circuit and the processing unit constitute an autonomous control assembly.

According to a second embodiment, the subject of the invention is a device characterized in that the measurement circuit and the command circuit are elements of a numerical control system of a manufacturing unit, the processing unit is a computer connected to the numerical control system and the dialogue means are a console connected to the computer.

According to a third embodiment, the subject of the invention is a device characterized in that the measurement circuit, the command circuit, the dialogue console and the processing unit are elements of a numerical control system of a manufacturing unit.

BRIEF DESCRIPTION OF THE DRAWINGS

The invention will be better understood with the aid of the attached drawings, in which:

FIG. 3 represents the class profiles over the petroleum level, which is the controlled physical quantity in the example described.

FIG. 4 represents the class profile over the secondary variable E2, over the CONTEXT variable and over the variation DF in the action quantity F, for the example described.

FIG. 5 represents the decision tables for the example described.

FIG. 7 represents the MIN/MAX operator for premiss aggregation, the PRODUCT operator on rule conclusions, the CENTER OF GRAVITY method for defuzzification.

DETAILED DESCRIPTION OF THE INVENTION

In general, the method and the device of the invention are used for keeping the value of a controlled physical quantity, subjected to perturbations, between two limit values by acting on an action quantity, so as to minimize the fluctuations in the action quantity.

Figure 1:
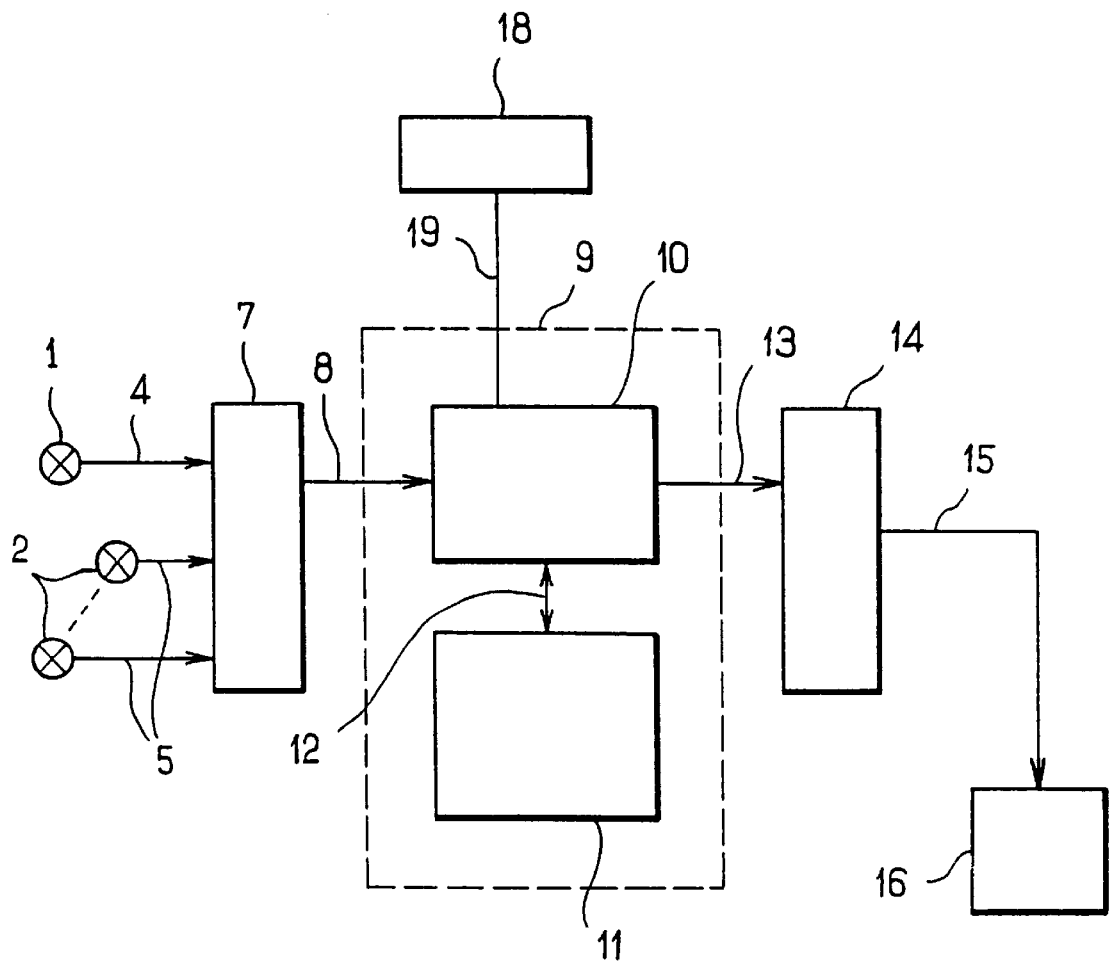
FIG. 1 schematically represents a controller according to the description of the invention.

The control device of the invention, represented in FIG. 1, includes:

- a sensor 1 for measuring the controlled physical quantity, which provides on one output 4 an electric signal representative of the controlled physical quantity;
- a plurality of sensors 2 for measuring physical quantities used to determine the detection variables representative of the causes of perturbation in the controlled physical quantity, which provide on a plurality of outputs 5 electric signals representative of detection variables;
- a measurement circuit 7, connected to the output 4 of the sensor 1 and to the plurality 5 of outputs of the plurality of sensors 2, provided with an output 8 which delivers in digital form an electric signal representative of values of the controlled physical quantity and of the detection variables;
- a processing unit 9 connected to the output 8 of the measurement circuit 7, comprising storage means 11 and an execution processor 10, provided with an output 13 which delivers an electric signal representative of the value of the action quantity;
- a command circuit 14 provided with an input connected to the output 13 of the processing unit and with an output 15;
- a controllable actuator 16, provided with a command input connected to the output 15 of the circuit 14; and
- dialogue means (console) 18 connected by the line 19 to the execution processor.

The sensor 1 and the plurality of measurement sensors 2 deliver analogue electric signals, representative respectively of the value of the controlled physical quantity and of the physical quantities causing the perturbations in the controlled physical quantity.

The measurement circuit 7 converts the analogue electric signals delivered by the sensor 1 and the plurality of sensors 2 into digital electric signals.

The execution processor 10 of the processing unit 9 receives, via the line 8, the digital electric signals emitted by the measurement circuit 7.

In order to obtain the output value 13, the processor 10 periodically executes a program contained in the storage means 11.

According to the method of the invention, the value of the action quantity is determined by using:

- the instantaneous values of the controlled physical quantity measured by the sensor 1;
- the values, calculated by the processor 10, of a constructed secondary variable connected with the direction of variation of the controlled physical quantity; and
- the values of a context variable which are obtained by the processor 10 from the measurements delivered by the plurality of sensors 2, representative of the physical quantities causing the perturbations in the controlled physical quantity.

Through the dialogue means 18 an operation range is defined for the controlled physical quantity, for the secondary variable, for the context variable and for the action quantity, that is to say an interval, intrinsic to each of these quantities, within which they may vary.

A set of characteristic operation classes and a set of decision rules are furthermore defined through a specific dialogue tool not represented in FIG. 1. Each rule associates a value class of the controlled physical quantity, a class of the secondary variable and a class of the context variable with a class of the action variable.

In order to obtain this set of decision rules, the first step is to describe the unperturbed operation of the controller using a first set of rules which combines the instantaneous and secondary variable classes with the action variable.

This first set of rules thus obtained is then associated with the context variable class corresponding to unperturbed operation.

Knowing that the action quantity obeys a control law stabilizing the controlled physical quantity, the direction of the action is always chosen such that it compensates for the change measured by the secondary quantity, that is to say that the direction of change of the measurement quantity, induced by the chosen action quantity, will always be counter to that provided by the secondary quantity.

The other sets of decision rules associated with the other classes of the context variable, corresponding to perturbed operation, are obtained by modifying this first set of rules by adaptation of the action classes used, such that the variation amplitude of the action quantity is attenuated if the effects predicted by the context variable are opposed to the effects of the instantaneous value of the controlled physical quantity or that of the secondary variable. The effects connected with the values of the controlled physical quantity correspond to promoting recentering around the nominal value of the controlled quantity.

This produces an action strategy based on an asymmetry in the action amplitude as a function of the direction of change in the controlled physical quantity, provided by the secondary quantity, which makes it possible to promote change in the controlled physical quantity in the opposite direction to the direction of the perturbation, predicted by the context variable, which is to come, while guaranteeing that the controlled physical quantity is kept in the admissible range.

By virtue of these rule sets thus constituted, the controlled physical quantity changes between the two fixed limit values in such a way that the effects of the measured perturbations on the variations in the action quantity are highly attenuated in comparison with conventional control.

All the tables corresponding to these decision rule sets are stored in the storage means 11.

The processor 10 is provided, on the output 8 of the input circuit 7, with the values of the controlled physical quantity, measured by the sensor 1, and the values of the detection variables, measured by the plurality of sensors 2.

The processor 10 executes a program stored in the storage means, by virtue of which it first determines the value of the secondary variable and that of the context variable by applying adapted algorithms, then performs fuzzy inference on the decision rule set in order to obtain the value of the action variable.

The processor 10 then transfers the encoded value of the action quantity to the command circuit 14. The circuit 14 converts the encoded value of the action quantity into an electric command signal which activates the actuator 16.

According to another characteristic of the invention, the secondary variable involved in determining the value of the action quantity is obtained by differentiating the value of the controlled physical quantity with respect to time, which makes it possible to take into account the rate of change of the quantity.

According to another characteristic of the invention, the secondary variable involved in determining the value of the action quantity is obtained by applying the following formula:

$$E_2 = \frac{(DN)^3}{|DN|}$$

in which $E_2$ represents the value of the secondary variable;

DN represents the value of the derivative of the controlled physical quantity with respect to time;

|DN| is the absolute value of DN.

According to another characteristic of the invention, the context variable is obtained by determining the value of each of the detection variables, then subjecting each of these values to a time-filtering function, and finally linearly combining the values thus obtained while assigning a weighting coefficient to them.

The time-filtering function for a detection variable is produced by activating the variable in the calculation of the context variable as soon as specific freezing activation conditions are fulfilled and for a given period of time, during which the detection variable retains the value obtained at the moment of activating the freezing conditions.

The freezing duration is determined experimentally, is characteristic of each detection variable and is specific to each application. The same is true for the weighting coefficient and the activation conditions.

According to another characteristic of the invention, the context variable its determined as follows: the value of each of the detection variables is determined, then each of them is subjected to a time-filtering function and each of the filtered detection variables is then described in the form of a fuzzy variable.

The fuzzy variables thus obtained are combined in a decision rule set on which fuzzy inference is carried out.

By virtue of this characteristic of the invention, the behaviour of the control is adjusted progressively as a function of the anticipation context.

According to another characteristic of the invention, the controlled physical quantity, the secondary variable, the context variable, the detection variables and the action variable are described in the form of fuzzy variables with triangular class membership function profiles as represented in FIGS. 3 and 4. The classes are distributed uniformly over the operation range of each variable.

In FIGS. 3 and 4, the extreme classes of the fuzzy variables are labelled CE, the central classes are labelled CC and the nominal value of the controlled physical quantity is labelled VN.

According to another characteristic of the invention, the central class or classes which correspond to the nominal operation range (ranges) of the controlled physical quantity are described with the aid of trapezoidal class membership function profiles.

By replacing the triangular central class profile with a trapezoidal profile, for the controlled physical quantity, progressive attenuation of the amplitude of the action variable is obtained in a parametrizable vicinity around the nominal value of the controlled physical quantity. This parameterization is obtained by adjusting the width of the bases of the trapezia of the trapezoidal classes.

According to another characteristic of the invention, the intrinsic limits of the extreme classes of the value of the controlled physical quantity are modified so as to improve the behaviour of the control in perturbed phase, when this controlled physical quantity approaches limit values which are fixed for it.

By virtue of this characteristic, and taking into account the action classes chosen from the decision tables when a perturbation is detected, the controlled physical quantity is allowed to deviate from its nominal value in order to obtain better positioning which can attenuate the expected effects of the detected perturbation. In order to obtain this result, the change in the controlled physical quantity is limited to within a region, the limits of which, inside the admissible operation range, are adjusted by modifying the limits of the extreme classes of the controlled variable.

According to another characteristic of the invention, the decision rules which employ the central classes for the secondary variable and for the context variable are modified in order to ensure controlled recentering around the nominal value of the controlled physical quantity in unperturbed regime. This rule modification is equivalent to a modification of the classes of the action quantity, such that the amplitude of the action variable increases as the operation limits of the controlled physical quantity are approached. Thus, in unperturbed regime, the controlled physical quantity is positioned in the vicinity of its nominal value and is thereby best positioned to take into account future perturbations.

According to another characteristic of the invention, the decision rules which employ the extreme classes of the controlled physical quantity are modified in order to ensure unconditional recentering of the controlled physical quantity, within its operation range in the vicinity of the limits. These modifications over the rules in question consist in imposing on the action quantity extreme classes which are independent of the secondary variable.

According to a first embodiment of the control device, which implements the method forming the subject of the invention, represented in FIG. 1, the input circuit 7, the processing unit 9, the dialogue means 18 and the command circuit 14 constitute an autonomous assembly.

According to a second embodiment of the device, the input circuit 7 and the command circuit 14 are elements of a numerical control system of a manufacturing unit, and the processing unit 9 is a computer connected to the numerical control system.

According to a third embodiment of the device, the measurement circuit 7, the command circuit 14, the dialogue means 18 and the processing unit 9 are elements of a numerical control system.

Application example of the invention

The method and the device of the invention were applied to controlling the level of a balloon at the head of a column for atmospheric distillation of crude oil.

Figure 2:
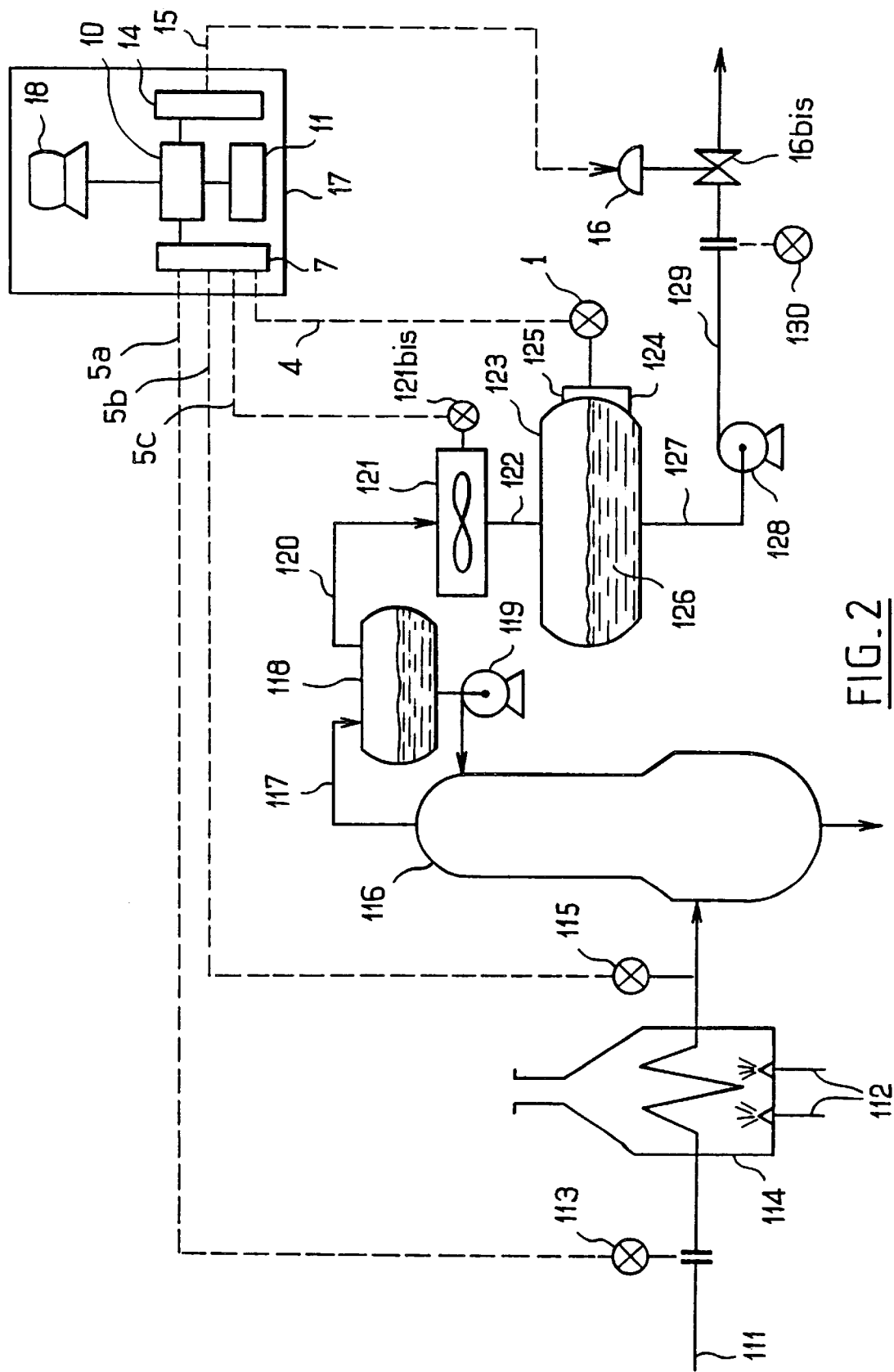
FIG. 2 schematically represents a plant for atmospheric distillation of crude oil, to which the method and the device forming the subject of the invention have been applied.

The installation includes the following elements, represented in FIG. 2:

a crude-oil supply pipeline 111;

a sensor 113 for measuring the crude-oil supply flow rate, which delivers on one output 5a an electric signal representative of the flow rate;

a preheat still 114 for the crude oil;

a plurality 112 of burners;

a sensor 115 for measuring the temperature of the crude oil at the outlet of the still 114, which delivers on one output 5b an electric signal representative of the temperature;

a crude-oil distillation column 116;

a line 117 for extraction at the head of the column 116;

a column-head reflex balloon 118;

a reflux pump 119;

a line 120 for extracting vapours from the balloon 118;

a battery 121 of air coolers supplied by the line 120;

an outlet line 122 of the battery 121 of air coolers;

a sensor 121b for stop/go states of the air coolers, which states are representative of the cooling power of the battery 121;

a balloon 123;

two taps 124 and 125 for measuring the petroleum level 126 in the balloon 123;

a sensor 1 for measuring the petroleum level 126 in the balloon 123, which delivers on one output 4 an electric signal representative of the level;

a line 127 for withdrawing from the balloon 123;

a pump 128 for withdrawing petroleum 126;

a delivery line 129 of the pump 128;

a sensor 130 for measuring the petroleum flow rate in the line 129;

a controller 17 provided with inputs to which the output of the sensor 1 for measuring the liquid level in the balloon 123, the output 5a of the sensor 113 for measuring the crude-oil flow rate, the output 5b of the temperature-measurement sensor 115 and the output 5c of the sensor 121b for determining the running states of the air coolers, which states are representative of the cooling power, are connected. In addition, the controller 17 delivers on one output 15 an electric signal representative of the value of the action quantity; and an actuator 16 for controlling a valve 16b for adjusting the petroleum flow rate in the line 129, the input of which is connected to the output 15 of the controller 17.

The controller 17 comprises an input circuit 7, a command circuit 14, itself comprising elements of the numerical control system of the crude-oil atmospheric distillation unit, a microcomputer provided with a processor 10 and with storage means 11, and a dialogue console 18.

Before implementation of the control method and of the device forming the subject of the invention, the petroleum level in the balloon 123 was controlled by means of a conventional algorithm controller. This control consisted in stabilizing the level in an admissible range by acting on the valve 16b in order to control the petroleum flow rate in the line 129.

The amplitude DF of the variation in the action exerted on the valve 16b was periodically determined according to the following formula:

$$DF(NLIM) = \frac{DN^2}{(NLIM - N)} \left( \frac{K}{DT} \right)$$

in which the various terms represent:
N=petroleum level
NLIM=upper or lower limit value of N
DN=variation of N between the current sampling instant and the preceding sampling instant
DT=the sampling period
K=constant
NMAX and NMIN are the extreme values of NLIM If $DN > 0$    $DF(NMAX) > 0$
If $DN < 0$    $DF(NMIN) < 0$
If $DN = 0$    $DF = 0$ With this algorithm, the action quantity is proportional to the square of the derivative of the level and inversely proportional to the deviation with respect to the limitation in question. The gain of the control system thus obtained is nonlinear, and asymmetric with respect to the direction of change of the level.

In addition, in the vicinity of the limitations, a maximum amplitude action correction with suitable direction is imposed so as to ensure recentering of the level in the admissible range.

The results were better than those obtained with an algorithm of PID type but were unsatisfactory.

Very large fluctuations in the petroleum flow rate in the line 129 were observed, which perturbed the operation of the downstream units and impaired the quality of the manufactured products.

The origin of these fluctuations was found to be the variations in the crude-oil supply rate, the variations in composition of the crude oil, the variations in temperature of the crude oil at the outlet of the still 114, induced, for example, by shutdown of one burner, and the variations in the cooling power generated by the battery 121 of air coolers.

When these perturbations appeared, the limits in which the petroleum level in the balloon 123 was allowed to vary were reached very quickly and led to loop disconnections of the in situ control, with automatic switching into proportional-integral control at a fixed set-point corresponding to the nominal value, which had the effect of accentuating the fluctuations in the petroleum flow rate at the outlet.

The method and the device forming the subject of the invention were implemented in order to avoid loop disconnections of the petroleum level control in the balloon 123 and to reduce the fluctuations in the petroleum flow rate in the line 129 by taking into account, by anticipation, the variations at the origin of the perturbations and by processing them by fuzzy inference mechanisms.

For this particular application, the controlled physical quantity is the petroleum level in the balloon 123, measured by the sensor 1, and the action quantity is the position of the valve 16b for controlling the petroleum flow rate in the line 129, measured by means of the sensor 130.

The detection variables which are representative of the physical quantities at the origin of the perturbations in the liquid level in the balloon 123 are determined from:
  the crude-oil flow rate which supplies the still 114, measured by the sensor 113,
  the composition of the crude oil, represented by the petroleum yield of the oil, determined in the laboratory and introduced into the storage means 11 with the aid of the console 18, the temperature of the crude oil at outlet from the still 114, measured by the sensor 115, the cooling power of the battery 121, represented by the number of air coolers in service, determined by the sensor 121b which takes into account the states of the air-cooler drive motors.

These four information items are combined in order to obtain the context variable according to a formula which will be specified hereafter.

The following operation ranges are defined beforehand:

for the controlled physical quantity, which is the level N of petroleum in the balloon 123: 0%, 100%, which corresponds to 25%, 75% on the physical scale, for the secondary variable, which is the time derivative DN of the level N: −100%, +100%, for the context variable: −100%, +100%, for the variation DF in the action quantity F, which is the position of the control valve 16b: −100%, +100%.

A set of characteristic classes is then defined:

5 uniformly distributed triangular classes for the petroleum level in the balloon 123, as represented in FIG. 3, the central class CC represented in dashes being optionally selectable with trapezoidal shape, 7 uniformly distributed triangular classes, for the constructed secondary variable E2 connected with the direction of variation of the petroleum level, for the context variable and for the variable DF representative of the variations in the action quantity F, as represented in FIG. 4.

A set of decision rules are then defined in the form of a three-dimensional table comprising 7 two-dimensional tables as represented in FIG. 5.

For each class of the context variable, a table of classes for the variable DF is defined, i.e. 7 tables.

Each of these 7 tables has two inputs which respectively correspond to the 5 classes of the level N and to the seven classes of the constructed secondary variable E2 connected with the direction of the level variation.

The 7 tables are reproduced in FIG. 5. Table T0 is the one associated with class 0 of the context variable, which represents the nominal context, that is to say the absence of perturbation.

The tables T1, T2 and T3 are associated with classes 1, 2 and 3 of the context variable. They are representative of the anticipation of level increase.

Tables T4, T5 and T6 are representative of the anticipation of a level decrease.

In each case, one table is associated with one decision rule.

For example:

If the context variable belongs to class 0 (Table T0, nominal context) and if the level N belongs to class −1 (fairly low level) and if the secondary variable E2 belongs to class 2 (slightly rising level), then the correction of the action variable DF belongs to class 2 (the correction of the flow rate will be medium positive).

The cell associated with this rule is referenced 24 in table T0 of FIG. 5, which corresponds to operation in nominal context.

The context variable is determined by means of the following formula:

CONTEXT=ε Bi*$E_{int}$ (Ci, Di, Ti)

in which the various terms have the following significance:
Bi relative weights of the detected deviations,
Ci activation conditions of the deviation contributions,
$E_{int}$ variations in the detection variables,
Ti starting instants of deviation detection,
Di specific durations for the time filtering/activation freezing for the detections, In our example, we will call the physical quantities causing the perturbations:
RDT the petroleum yield of the crude oil, representative of the composition of the crude oil,
FBR the crude-oil flow rate,
TSTILL the temperature of the crude oil at outlet from the still,
AERO the cooling power of the air coolers in service,
DRDT deviation in petroleum yield between the crude oil being processed and the crude oil previously processed,
DBFR DTSTILL represent the set-point measurement deviations of the quantities PBR and TSTILL elsewhere controlled by conventional P, I controllers.
DAERO represents the difference between the number of air coolers in service at the current instant and the previous sampling instant.

The table below gives the values of the various parameters.

| Detection variables | Petroleum yield deviation E1 = DRDT | Crude oil flow rate deviation E2 = DFBR | Still temperature deviation E3 = DTSTILL | Air-cooler deviation E4 = DAERO |
|---|---|---|---|---|
| Scales | +/−15% | +/−30% F crude oil SP | +/−20° C. | +/−1 |
| Activation condition | Crude oil change (C1) | \|DFBR\|> threshold DFBR (C2) | \|DFSTILL\|> threshold DFSTILL (C3) | DAERO × 0 (C4) |
| Weight Bi on normalized deviations | 2 | 1 | ½ | ¼ |
| Freezing durations | D1 = 4h | D2 = 1h | D3 = 1h | D4 = ¼h |

In this table, F crude oil SP is the set-point value of the crude-oil flow controller at the inlet of the distillation unit, THRESHOLD DFBR and THRESHOLD DTSTILL are respectively the values of DFBR and DTSTILL beyond which the detection variables are activated.

The changes in the crude oil are confirmed by the process operator of the atmospheric distillation unit.

The number of air coolers in service is 16.

The values Bi and Di are determined experimentally.

Figure 6:
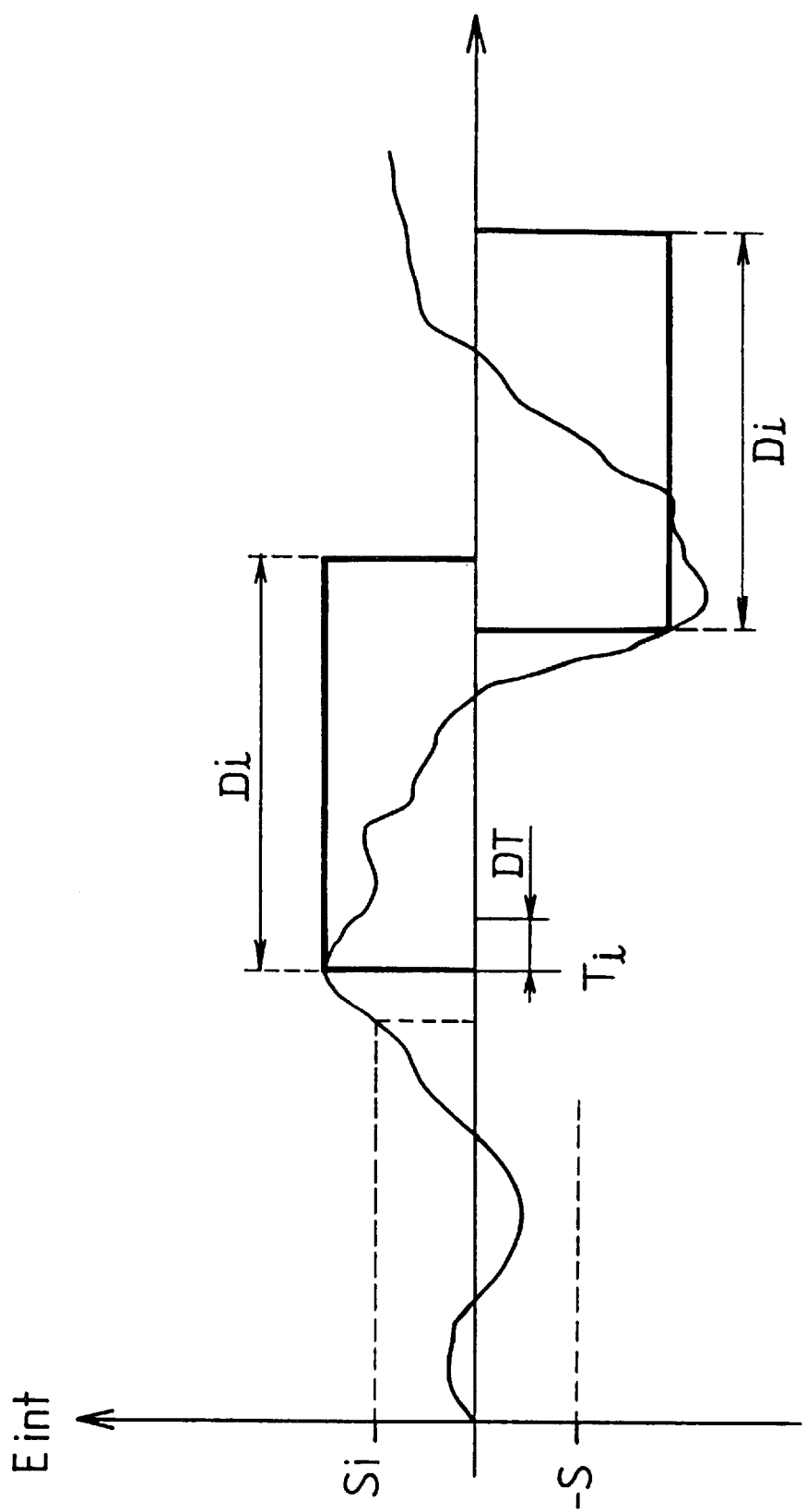
FIG. 6 represents the time-filter mechanism for the detection variables.

If the activation condition Ci is not verified, the contribution $E_{int}$ in the context calculation is zero. On the other hand, if Ci is verified, the deviation $E_{int}$ is taken into account in the following manner, illustrated by FIG. 6.

The value of the contribution $E_{int}$ is fixed during the period Di at the value measured at the start of detection Ti.

If, during this period, a larger drift than the fixed value of $E_{int}$ is detected since the instant Ti, the contribution $E_{int}$ is updated to its new value, which will be in turn frozen for a period Di.

In order to ensure controlled recentering around the nominal value of the liquid level N in the balloon, in unperturbed regime, the decision rules which employ the central classes for the derivative of the level and the context variable are modified.

These modifications appear in cells 21, 22 and 23 of table T0 in FIG. 5, which respectively contain the values −1, 0 and 1. In the absence of modifications, these values would have been equal to zero.

Fuzzy inference is then carried out in the following manner:

The premiss aggregation operator, chosen to combine the conditions of an active fuzzy rule, is the MIN/MAX operator. This operator makes it possible to choose the smallest membership degree associated with the active input classes in the event that the rule premiss conditions are conjunct and the largest membership degree when the rule premisses are disjunct conditions.

The contributions on the output are determined by modifying the rule conclusion class profile by taking the product of the membership function of the class with the membership degree obtained by applying the premiss aggregation operator.

The defuzzification method chosen is the center of gravity method, which makes it possible to calculate the value of the action quantity from the various rule conclusion class profiles obtained.

Processing of the rule, referenced 24 in FIG. 5, using the MIN and PRODUCT operators, is represented in FIG. 7.

In our example, the secondary variable is obtained from the derivative of the petroleum level with respect to time, by the following formula:

$$E2 = \frac{(DN)^3}{|DN|}$$

in which the terms have the following significance:
E2: secondary variable,
DN represents the derivative of the petroleum level N in the balloon with respect to time,
|DN| represents the absolute value of DN.

The results obtained with the controller forming the subject of the invention are as follows:

There is no loop disconnection of the control during changes in quality of the crude oil supplying the distillation unit.

The maximum correction amplitude for the petroleum flow rate was reduced from 1 t/min to 300 kg/min for a petroleum flow rate of between 90 and 220 t/hour.

Example of the results obtained:

|  | Petroleum flow rate in t/hour | |
| --- | --- | --- |
|  | Mean | Standard deviation |
| With conventional controller | 158.3 | 4.74 |
| With the controller forming the subject of the invention | 158.4 | 2.20 |

We claim:

1. A method for controlling a value of a physical quantity characteristic of an operation of a manufacturing unit and dependent on an action quantity represented by an opening value of a valve for controlling a fluid flow from said unit, said physical quantity being subjected to perturbations during operation of the manufacturing unit, said method comprising: modifying the value of the action quantity determined based on the instantaneous values of the controlled physical quantity, to maintain the value of the controlled physical quantity between two limiting values located on opposite sides of a nominal value, the improvement which comprises:

determining values of a secondary constructed variable, based on the direction of variation of the controlled physical quantity;

determining values of a context variable based on at least one detection variable or a combination of detection variables, which detection variables are representative of physical quantities which cause perturbations in the controlled physical quantity;

wherein control is implemented by defining an operating range and a series of characteristic operating classes with central classes and extreme classes for each of the controlled physical quantity, the secondary constructed variable, the context variable, and the action quantity;

defining a set of decision rules, each rule comprising associating one value class of the controlled physical quantity, one class of the secondary constructed variable, and one class of the context variable with one class of the action quantity, and performing fuzzy inference on the set of decision rules based on the values of the controlled physical quantity, of the secondary constructed variable and of the context variable, to obtain the value of the action quantity.

2. The method according to claim 1, wherein the secondary constructed variable is obtained by differentiating the controlled physical quantity with respect to time.

3. The method according to claim 1, wherein the secondary constructed variable is obtained by applying the following formula:

$$E_2 = \frac{(DN)^3}{|DN|}$$

in which
$E_2$ represents the secondary constructed variable;
DN represents the derivative of the controlled physical quantity with respect to time; and
|DN| is the absolute value of DN.

4. The method according to claim 1, wherein determining of the context variable comprises the steps of:

determining the value of each of the detection variables,
subjecting each of said determined values to an adapted time-filtering function,
then linearly combining the time-filtered values, and
assigning to said linearly combined values an adapted weighting coefficient.

5. The method according to claim 1, wherein determination of the context variable comprises the steps of:

determining the value of each of the detection variables,
subjecting each of said determined variables to an adapted time-filtering function,
then describing each of the time filtered detection variables in the form of a fuzzy variable,
combining the fuzzy variables obtained in a set of decision rules, and
carrying out fuzzy inference on said Set of decision rules to obtain the context variable.

6. The method according to claim 1 wherein the controlled physical quantity, the secondary constructed variable, the context variable and the at least one detection variable are described in the form of fuzzy variables with triangular class membership function profiles, said class profiles being uniformly distributed over each operation range.

7. The method according to claim 1, wherein at least one central class which corresponds to at least one nominal operation range of the controlled physical quantity is described with the aid of trapezoidal class membership function profiles.

8. The method according to claim 1, further comprising the step of modifying intrinsic limits of extreme classes of the value of the controlled physical; quantity to adapt the behavior of the control in a perturbed phase, in the vicinity of the limits of the controlled physical quantity.

9. The method according to claim 1, further comprising the step of modifying the decision rules which employ central classes for the secondary constructed variable and the context variable in order to ensure controlled recentering around the nominal value of the controlled physical quantity in an unperturbed regime.

10. The method according to claim 1, further comprising the step of modifying the decision rules which employ extreme classes of the controlled physical quantity so as to ensure unconditional recentering of the controlled physical quantity within its operation range.

11. A control device for keeping a controlled physical quantity subjected to perturbations within two limit values, by acting on an action quantity on which the controlled physical quantity depends, in which there is a component for controlling the action quantity, said device comprising:

a sensor for measuring the controlled physical quantity, said sensor having an output which provides a measurement signal representative of an instantaneous value of said physical quantity;

measurement sensors for measuring detection variables representative of causes of perturbation in the value of the controlled physical quantity, said sensors having outputs which provide measurement signals of said detection variables;

a controllable actuator, including a command input and an output connected to said component for controlling the action quantity;

a measurement circuit, connected to the output of the sensor for measuring the controlled physical quantity and to the outputs of the measurement sensors, said measurement circuit having one output which delivers signals representative respectively of the controlled physical quantity and of the detection variables;

a processing unit connected to the output of the measurement circuit, said processing unit having an output providing a signal representative of calculated value of the action quantity;

dialogue means connected to the processing unit;

a command circuit including an input connected to the output of the processing unit and an output connected to a command input of the controllable actuator;

the processing unit including:
storage means which contains at least one decision rule table and a program for calculating the action quantity from the value of the controlled physical quantity, from the value of the secondary constructed variable corresponding to a direction of variation of the controlled physical quantity and from the value of a context variable calculated from a combination of detection variables which are representative of the physical quantities causing the perturbations in the controlled physical quantity, the said program employing fuzzy inference mechanisms and, a program for executing the calculation program.

12. The control device according to claim 11, wherein the storage means contains a processing program which calculates the context variable by subjecting the value of each of the detection variables to an adapted time-filtering function, then linearly combining the time-filtered values, and assigning a weighting coefficient to said combined values.

13. The control device according to claim 11, wherein the storage means contains a processing program which calculates the context variable by subjecting the value of each of the detection variables to an adapted time-filtering function, and then using the calculated values in a set of decision rules according to fuzzy inference mechanisms.

14. The control device according to claim 11, wherein the measurement circuit, the command circuit and the processing unit constitute an autonomous control assembly.

15. The control device according to claim 11 wherein the measurement circuit and the command circuit are elements of a numerical control system of a manufacturing unit, the processing unit is a computer connected to said numerical control system and the dialogue means is a console connected to the computer.

16. A control device according to claim 11, wherein the measurement circuit, the command circuit, the dialogue means and the processing unit are elements of a numerical control system of a manufacturing unit.

* * * * *